(12) United States Patent
McBride

(10) Patent No.: US 7,938,250 B2
(45) Date of Patent: *May 10, 2011

(54) CONVEYOR BELT SCRAPER

(75) Inventor: Randy Garth McBride, Surrey (CA)

(73) Assignee: McBride Belting & Hose Ltd., Surrey, British Columbia (CA)

( * ) Notice: Subject to any disclaimer, the term of this patent is extended or adjusted under 35 U.S.C. 154(b) by 6 days.

This patent is subject to a terminal disclaimer.

(21) Appl. No.: 12/497,290

(22) Filed: Jul. 2, 2009

(65) Prior Publication Data
US 2009/0321221 A1   Dec. 31, 2009

Related U.S. Application Data

(63) Continuation-in-part of application No. 12/100,821, filed on Apr. 10, 2008, now Pat. No. 7,648,019.

(51) Int. Cl.
*B65G 45/12* (2006.01)
(52) U.S. Cl. .................................. 198/497; 198/499
(58) Field of Classification Search .............. 198/497, 198/499
See application file for complete search history.

(56) References Cited

U.S. PATENT DOCUMENTS

| | | | |
|---|---|---|---|
| 4,105,109 A | 8/1978 | Schultz | |
| 4,290,520 A | 9/1981 | Rhodes | |
| 4,694,952 A | 9/1987 | Meijer | |
| 4,825,997 A | 5/1989 | Bowman et al. | |
| 5,213,197 A | 5/1993 | Mohri | |
| 5,339,947 A * | 8/1994 | Campanile | 198/499 |
| 5,372,244 A | 12/1994 | Morin | |
| 5,722,528 A * | 3/1998 | Dolan | 198/499 |
| 6,213,287 B1 | 4/2001 | Juracko | |
| 6,227,350 B1 | 5/2001 | Yoshizako et al. | |
| 6,241,075 B1 | 6/2001 | Krumscheid | |
| 7,648,019 B2 * | 1/2010 | McBride | 198/499 |

* cited by examiner

*Primary Examiner* — James R Bidwell
(74) *Attorney, Agent, or Firm* — Oyen Wiggs Green & Mutala, LLP

(57) ABSTRACT

A conveyor belt cleaning device which can handle conveyor belts with damaged areas, mechanical joints, and/or head pulleys with profile spaces causing the conveyor belt to run unevenly, is provided. The scraper blade is attached to a plurality of T-shaped elements each of which has pressure applied by an air bladder held within a housing. The T-shaped elements move freely within the housing to permit movement of the scraper blade in a direction tangential to as well as perpendicular to the conveyor belt.

5 Claims, 11 Drawing Sheets

CONVEYOR BELT SCRAPER

REFERENCE TO RELATED APPLICATIONS

The present application is a continuation-in-part, under 35 U.S.C. §120, of U.S. patent application Ser. No. 12/100,821 filed Apr. 10, 2008 entitled "Conveyor Belt Scraper", now U.S. Pat. No. 7,648,019.

TECHNICAL FIELD

The invention relates to the field of scrapers and cleaners for conveyor belts which remove conveyed material which has adhered to the belt on the return path.

BACKGROUND

Conveyor belts are used to move or convey bulk particulate materials. A conveyor belt consists of a face side and a back side. The face side receives the load of product at a load point and carries the product in the conveying direction to a discharge point where the product is then unloaded. A product residue may adhere to the belt, build up over the span of the conveyor belt face, and release onto return rolls and may then drop to the ground and/or body of water. The back side of the conveyor belt is not designed to carry product. The conveyor belt rides on rollers or a deck attached to a conveyor system structure that is ridged, with a starting point (usually a tail pulley) and an ending point (a head pulley). The conveyor belt may have a mechanical joint or a non-profiled seam, to create an endless belt with no start or end. The conveyor belt runs uniformly around the tail pulley and the head pulley, supported between the two pulleys by a deck or rollers on the top face and carrying rolls on the bottom return. With the transfer of product residue to the conveyor structure, a residue build-up can occur causing belt shifting, and resulting in damage to the belt, structure, and/or rollers.

To address the foregoing problem, scrapers or cleaners are provided to scrape and clean the belt immediately following the discharge point on the head pulley. This has been addressed previously by providing a spring-mounted blade in contact with the belt. A challenge that such current cleaners face is the ability to clean the surface of a belt that contains irregularities or reverses direction. Conveyor belts may have uneven surface wear, mechanical joints or have had cuts patched with rip plates, and there may be abnormalities on the head pulley. Current scrapers and cleaners do not have the ability to handle such irregularities. U.S. Pat. No. 4,290,520 to Rhodes discloses a conveyor belt cleaning device in which the pressure on the scraper blade is applied by a pressurized bag, however the scraper blade can only slide in one direction in the housing and is not free to move in the direction tangential to the surface of the conveyor belt. There is a need therefore for a belt cleaner that can divert product residue off the face of a belt at the offloading point, even if the surface of the head pulley contains ridges and irregularities, or where the belt surface has irregularities such as laced joints, rip plates, and patch repairs, or where the belt reverses direction.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention provides a conveyor belt cleaning device which can handle reversing conveyor belts and conveyor belts with damaged areas, mechanical joints, and/or head pulleys with profile spaces causing the conveyor belt to run unevenly. The scraper blade is attached to a T-shaped element which has pressure applied by an air bladder held within a housing and which moves freely within the housing to permit movement of the scraper blade in a direction tangential to, as well as perpendicular to, the surface of the conveyor belt.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
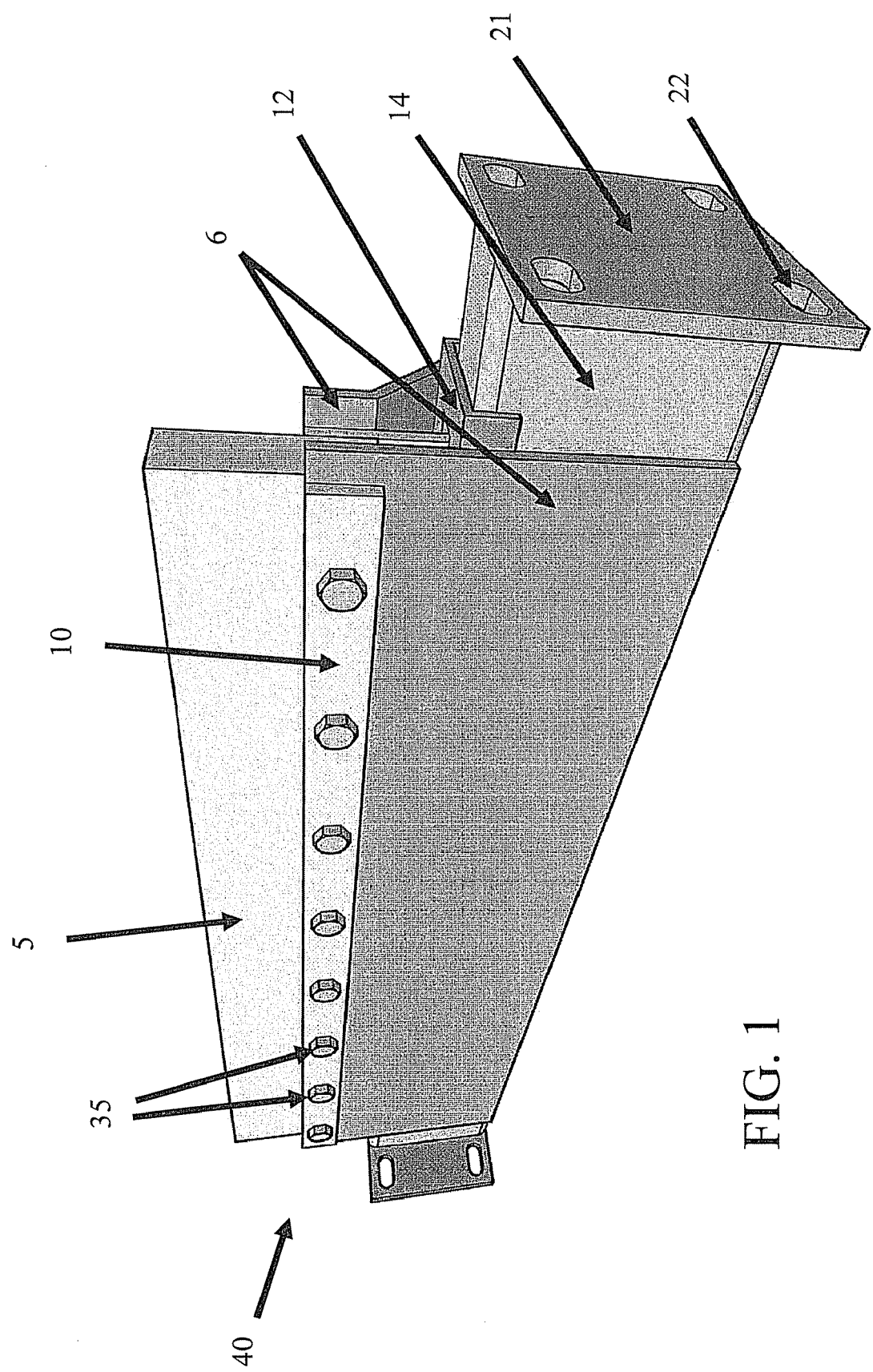
FIG. 1 is a front perspective view of the scraper of the invention.
Figure 2:
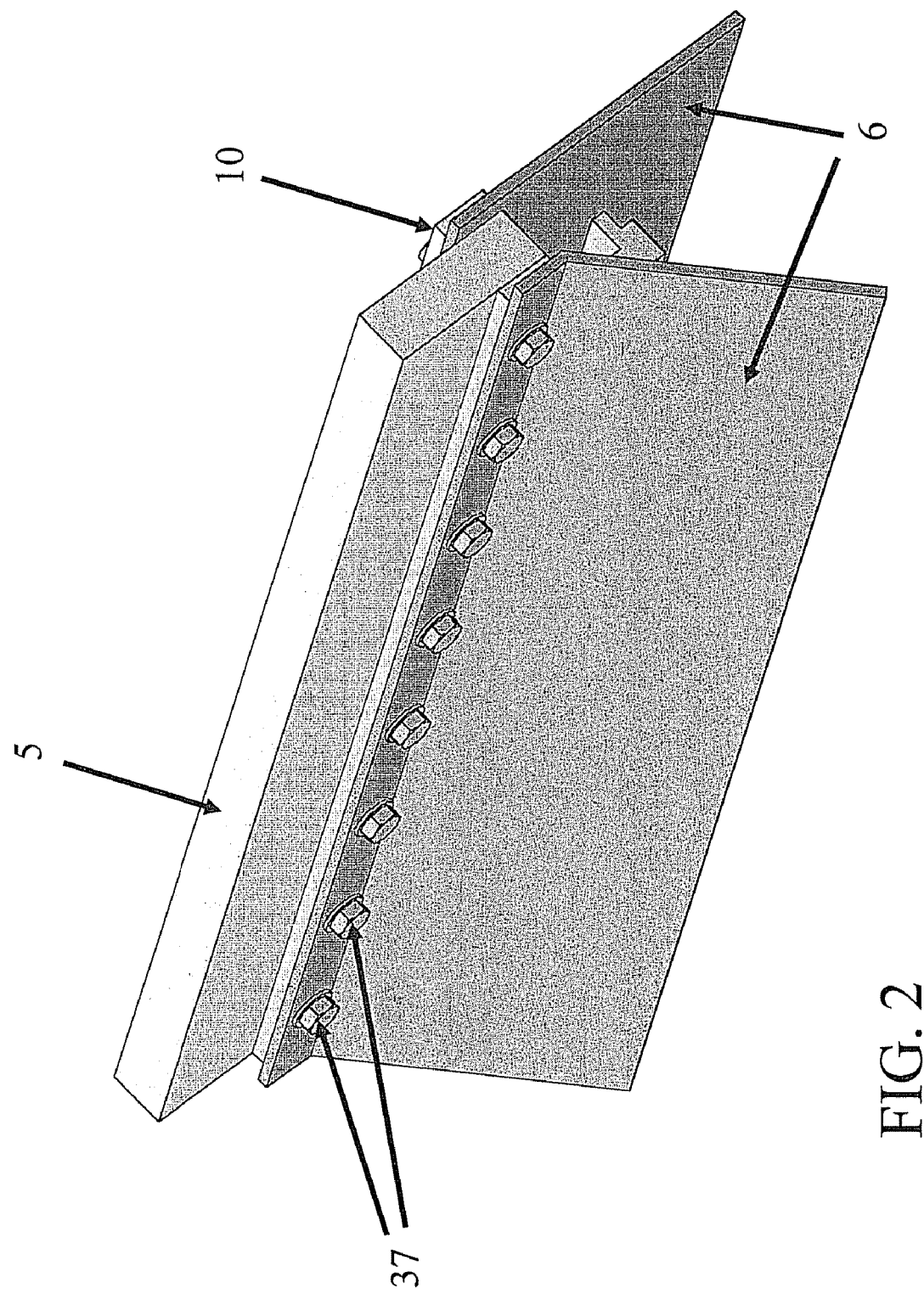
FIG. 2 is a rear perspective view of the scraper shown in FIG. 1 with the support bar removed.
Figure 3:
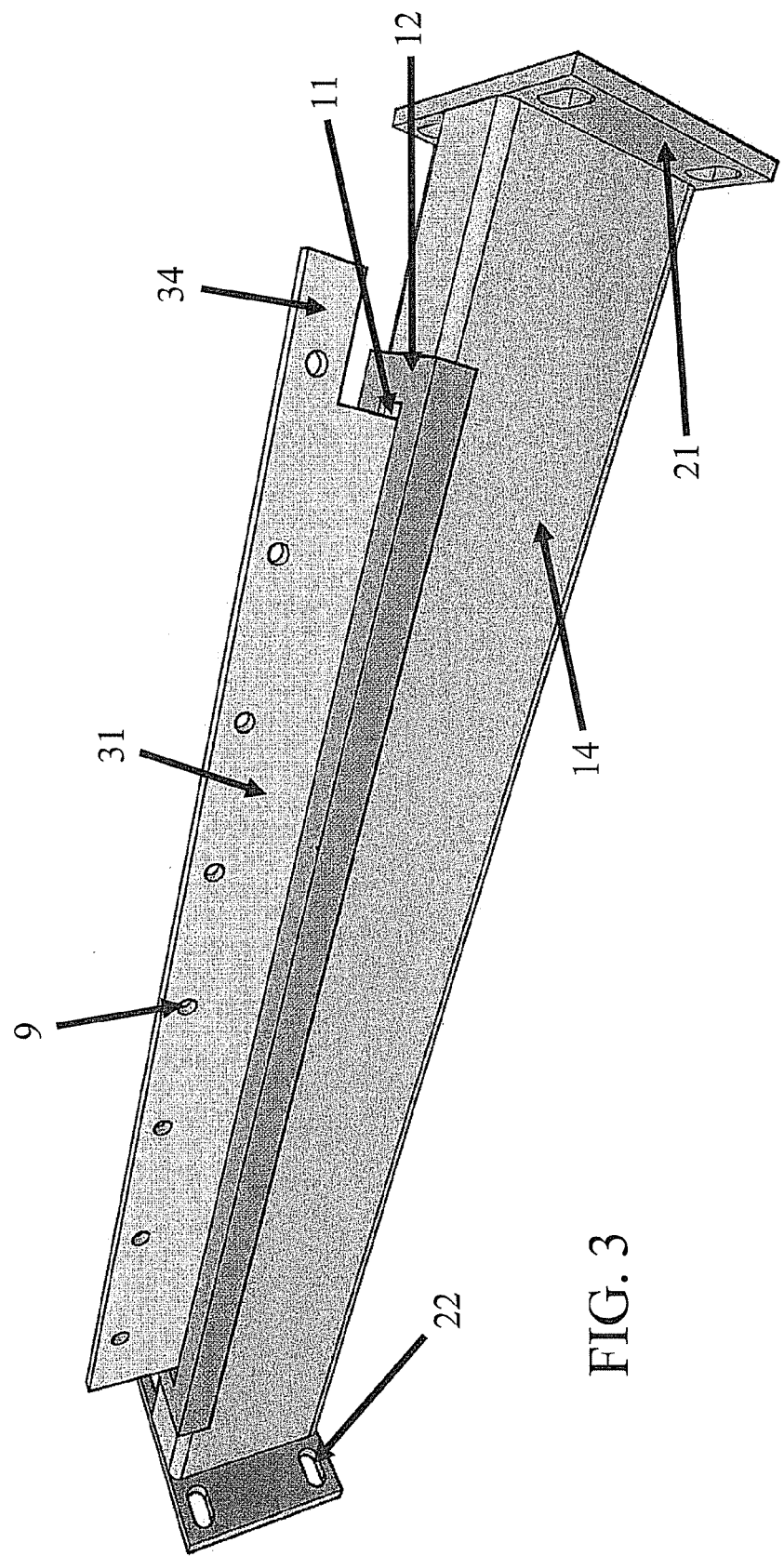
FIG. 3 is a front perspective view of the scraper shown in FIG. 1 with the cleaning element removed.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

With reference to FIG. 1-4, conveyor belt scraper 40 comprises an air bladder housing 14 having end caps 21, scraper blade 5 mounted on mounting plate 31, attachment bar 10 and urethane shields 6. Housing 14 is preferably made of a two-inch by four-inch rectangular steel tube. The end caps 21 are welded on the ends of the steel tube 14 and each end cap has holes 22 for receiving bolts for mounting the scraper 40 to the conveyor.

Figure 4:
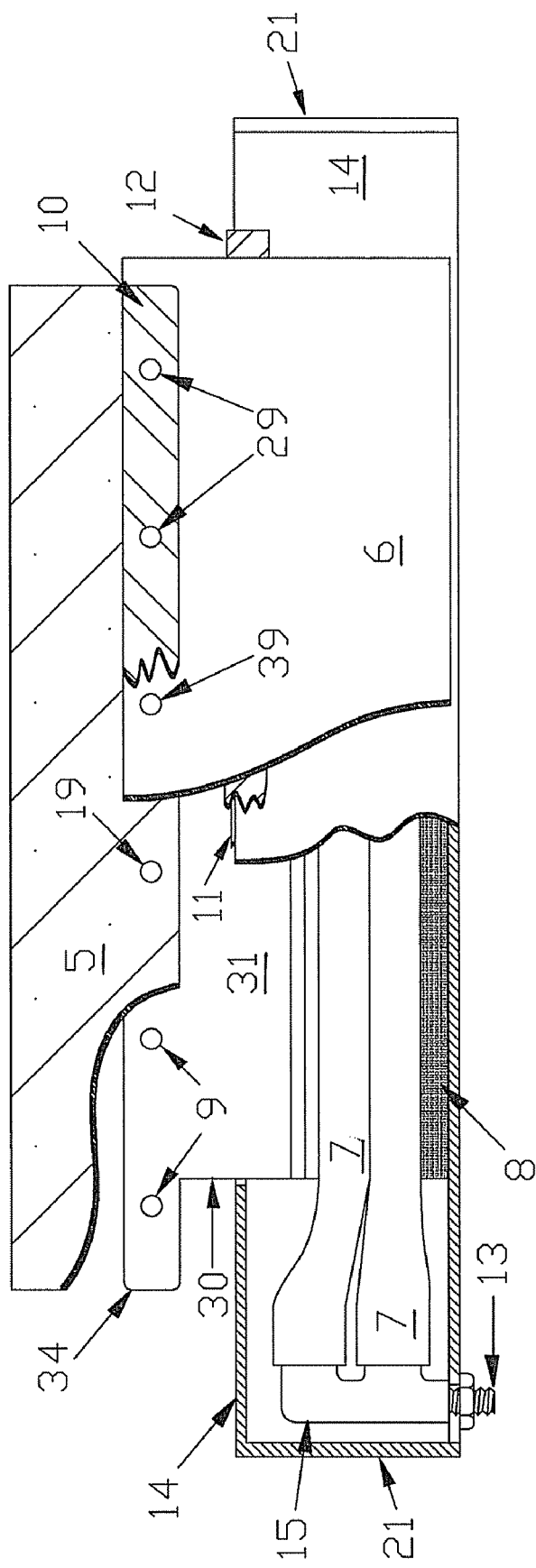
FIG. 4 is a front cutaway view of the scraper shown in FIG. 1.
Figure 7:
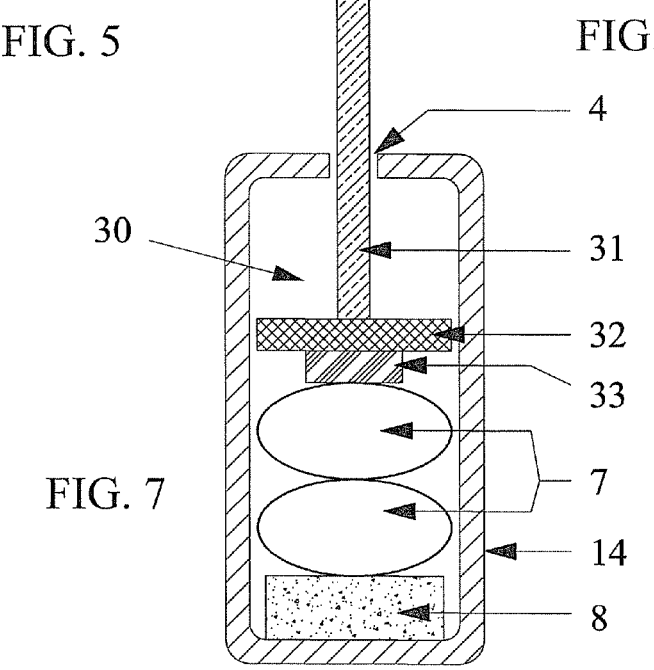
FIG. 7 is a cross-section view of the scraper shown in FIG. 1.
Figure 8:
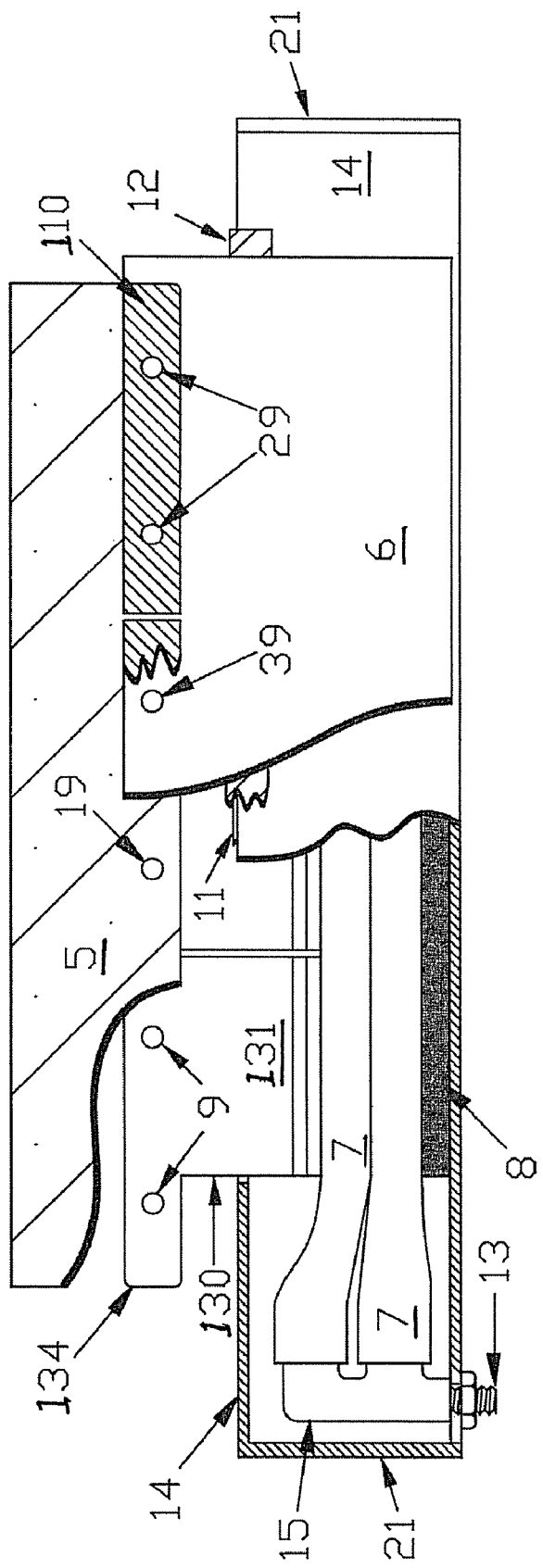
FIG. 8 is a front cutaway view of a second embodiment of the scraper of the invention in which the T-bar is segmented.
Figure 9:
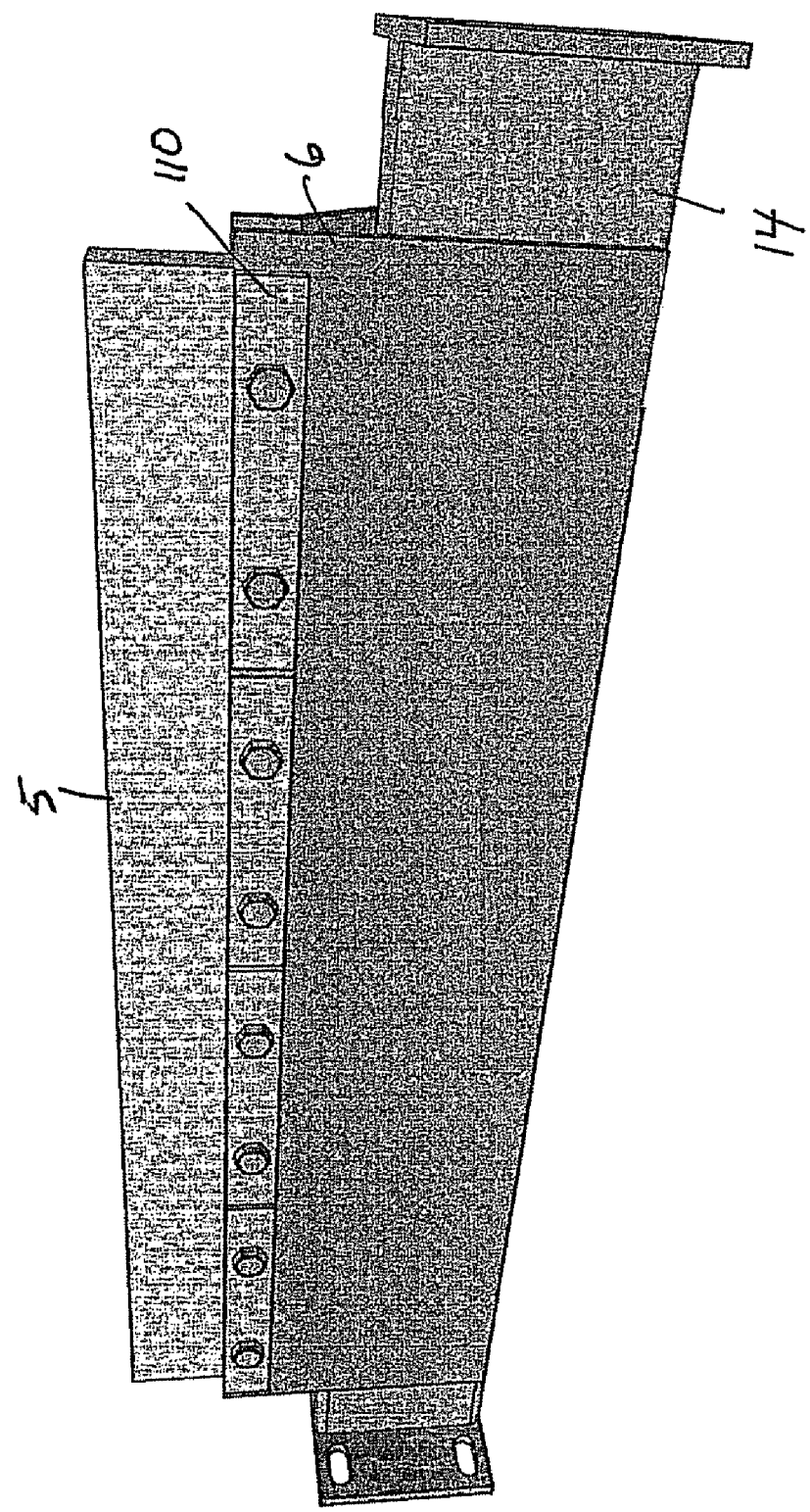
FIG. 9 is a front perspective view of the scraper shown in FIG. 8.

FIG. 4 and FIG. 7 illustrate the different elements of the scraper in cutaway view and cross-section. The housing 14 (FIG. 1) has a lengthwise slot 4 (FIG. 7) which may be divided into two or more slots depending on the length of area to span. Preferably the length of housing 14 is greater than the width of the conveyor belt for which the scraper will be used, preferably about six inches greater. The ends of slot 4 are preferably spaced inwardly from each end of the housing 14, for example starting five inches from one end of housing 14 and three inches from the other. Slot 4 runs down the center of the top surface of housing 14. Housing 14 contains air bladders 7, air manifold 15, base pad 8 and T-bar 30, the mounting plate 31 portion of which extends up through slot 4. Dust shield 11 and bracket 12 are provided on housing 14.

The T-bar 30 (FIGS. 3, 7) is made up of three elements: mounting plate 31, base 32, and spacer 33. Mounting plate 31 extends through the slot 4 of the housing 14 and serves as the means to hold the scraper blade 5 and the urethane shields 6. Spacer 33 is a flat bar, for example measuring three quarters inch wide by quarter inch thick steel. The length of spacer 33 is preferably slightly less than the length of the scraper blade 5, for example by about 2 inches. Spacer 33 acts as a spacer and the contact point to the air bladder 7. Spacer 33 is welded down the center of base 32. Base 32 is a flat bar, for example measuring one and half inch wide by quarter inch thick steel having the same length as spacer 33. The purpose of spacer 33 and base 32 is to form the base of the T-bar 30. Mounting plate 31 is a flat bar, for example measuring three inches wide by one-quarter inch thick steel having the same length as base 32 and spacer 33. Mounting plate 31 is welded on edge, perpendicular down the center of base 32. As shown in FIG. 4, a steel tab 34, for example about two inches long by one inch wide by one-quarter inch thick, may be formed on mounting plate 31 such as by welding to the side and level with the top edge of plate 31. This permits the scraper blade 5 to extend over a greater length and be centered on the housing 14 notwithstanding that a portion of the housing is occupied by the air manifold 15 and connection to air bladder 7. T-bar 30 has a series of bolt holes 9 (FIG. 3) drilled along the upper edge of mounting plate 31 for attaching the scraper blade 5.

Figures 5, 6:
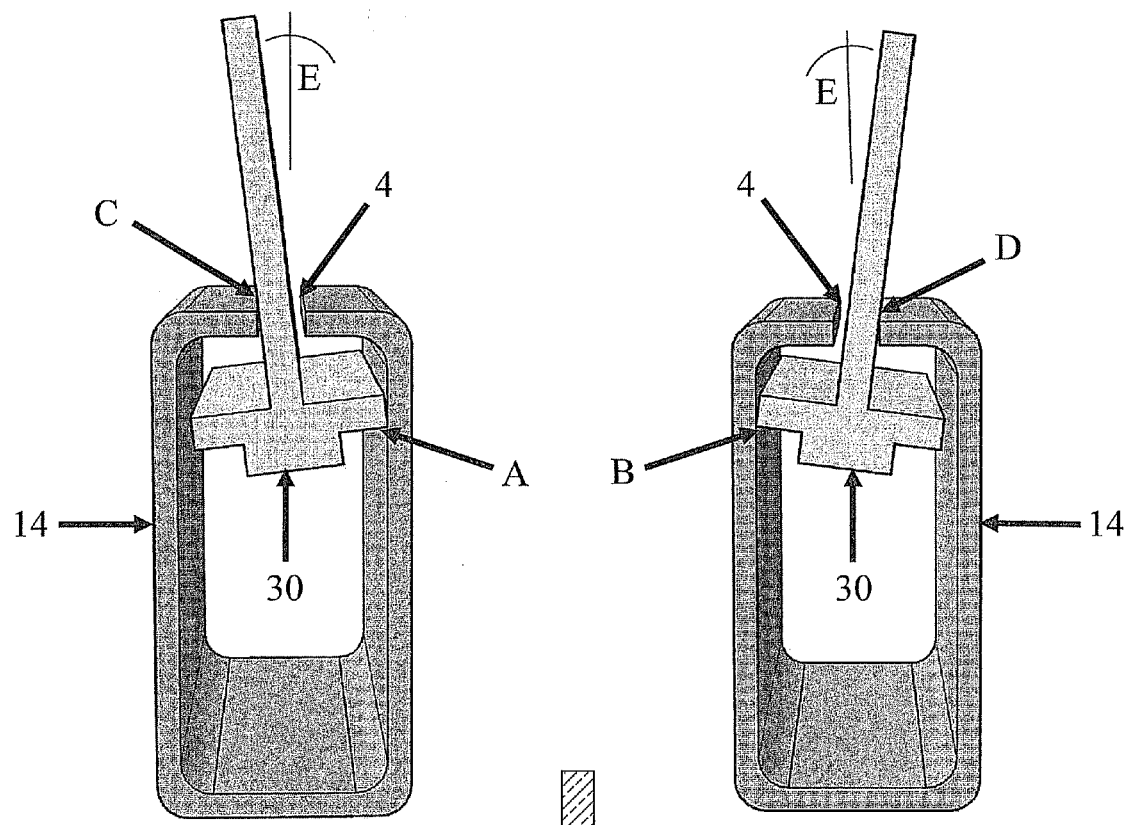
FIG. 5 is a detail perspective view illustrating the T-bar element in a first position.
FIG. 6 is a detail perspective view illustrating the T-bar element in a second position.

T-bar 30 acts as the mounting bracket to which the scraper blade 5 (FIG. 1), urethane shield 6 (FIGS. 1, 2), and attachment bar 10 (FIG. 1) are attached. As shown in FIGS. 5 and 6, when under pressure from the conveyor belt and any irregularities, the T-bar 30 presses against the side wall of housing 14 at A or B and one side near the slot 4 causing a pinch point C or D, allowing the T-bar 30 to tilt slightly forward or back, as represented in FIGS. 5 and 6, by an angle E from the vertical which is typically 3 to 5 degrees but may be as much as 10 degrees depending on the dimensions of the belt and scraper and type of application, and the extent of inflation of air bladders 7. The T-bar 30 has little resistance along the flat walls of housing 14 and with the pressure provided by the air bladder 7, the T-bar 30 floats independently, with the ability to travel up and down as well as pivot back and forth enabling it to clean a belt that reverses and react to the obstacles that a conveyor belt may encounter. Similarly the mounting plate 31 can travel up and down, without any external bracing on the mounting plate 31. The T-bar cannot be removed from the housing 14 and is the only element to which the scraper blade 5 is bolted.

The slot 4 (FIG. 5-7) allows the T-bar 30 to glide up and down, and pivot forward and back. Pulleys containing slide lag, with spaces missing in between and clips holding rips together, do not prevent the scraper from cleaning the conveyor belt surface due to the ability of the T-bar to pivot back and forth. The slot 4 may be, for example, five-sixteenths of an inch wide and cut along the center of the top side of the housing 14. When used on a conveyor belt greater than thirty-six inches wide, the slot 4, preferably is split by a one inch bridge of steel which is left between the two sections of slot 4 to maintain the strength of the housing 14.

The air bladder 7 (FIGS. 4, 7) consists of a single bladder folded in half and connected at its ends to air manifold 15. Air bladder 7 may be constructed for example of one-inch diameter rubber hose. Air manifold 15 which connects to the air in-take mounting bracket 13 to create a double lift system inside the housing 14. The air bladder 7 spans the length of the housing 14. The interior base pad 8 (FIG. 4 and FIG. 7), is a 1.5 inches wide by ½-inch thick rubber material. The interior base pad 8 acts as a spacer and noise damper. It lies along the interior base of the housing 14.

The air intake mounting bracket 13 (FIG. 4) is a connector that allows the air supply to be attached to the air bladder 7. The air intake mounting bracket 13 is preferably positioned on the opposite side of housing 14 in relationship to the slot 4 adjacent an end of housing 14. The air intake mounting bracket 13 has an air inlet valve that protrudes through a slot and locks in place by mean of a lock nut onto the housing 14. An air hose (not shown) with a threaded fitting is connected to the air intake valve on the air intake mounting bracket 13 allowing an air pump or regulated controlled air source to be attached to provide air under pressure. A relatively low pressure, such as 5 psi, is sufficient and may be provided by a hand pump such as a bicycle tire pump. Other pressurized fluids, such as hydraulic fluid, may also be used in the bladder 7.

The scraper blade 5, mounted on the T-bar 30 by means of bolts through holes 19, is the blade or pad that is kept in contact with the face side of the conveyor belt that causes the residue to be removed from the belt. Its construction will vary depending on the application, but it will typically be a rigid rubber material which may have a steel tip for certain applications. Typically it will measure about three inches in height, one-inch in thickness, with its length determined by the conveyor belt width. As the scraper blade 5 wears away, the T-bar 30 extends a maximum height above slot 4 when base 32 contacts the top surface of the interior of housing 14, for example 1.5 inches, leaving ½-inch of scraper blade 5 so the steel of the T-bar 30 never comes in direct contact with the surface of the conveyor belt. This remaining ½ inch of scraper blade 5 ensures no damage will come to the conveyor belt or any mechanical fasteners on the conveyor belt if applicable and/or the T-bar 30. Through use, the scraper blade 5 will wear down but can easily be changed.

The scraper 40 uses two urethane shields 6 (FIGS. 1, 2) which are mounted on both sides of the T-bar 30. One urethane shield 6 is secured by an attachment bar 10, and the other is secured by three-eighth inch washers and nuts 37. The urethane shields 6, once fastened to the T-bar 30, form a steep slope from the scraper blade 5 to prevent diverted residue from accumulating on the sides of the scraper 40, eliminate build-up of waste and keep dust or debris from invading the unit. The urethane shields 6 are non-stick material flashing, preferably about six inches wide by one-eighth of an inch thick, formed of smooth, highly wear-resistant material such as urethane. They are provided with holes 39 with the same bolting holes pattern as holes 19 and 29 in the scraper blade 5 and the attachment bar 10, and are held in place by the same bolts 35. The length of the urethane shield 6 is determined by the width of scraper blade 5 and is preferably somewhat longer, for example one-inch longer than the scraper blade 5 such that the urethane shield 6 extends one-half inch past each end of the scraper blade 5 when installed on the T-bar 30. Attachment bar 10 (FIG. 1) may be, for example an inch wide and a quarter inch thick flat steel bar. It is drilled with the bolting holes 29 in the same arrangement as holes 9, 19 and 39. It sandwiches one of the two urethane shields 6 and the scraper blade 5 between itself and the T-bar 30.

Scraper blade 5 is removably secured to mounting plate 31 by fasteners such as bolts 35 and associated washers and nuts 37. The bolting holes pattern is a series of three-eighth inch diameter holes drilled preferably about three inches apart on the T-bar 30 (reference numeral 9 in FIG. 3), the scraper blade 5 (reference numeral 19 in FIG. 4), the attachment bar 10 (reference numeral 29 in FIG. 4), and the two urethane shields 6 (reference numeral 39 in FIG. 4). The bolting holes pattern 9 must line up on all of these components enabling three-eighth inch diameter bolts to secure all of these components to the T-bar 30. As a result, under the drag and pressure of the scraper 40 in operation, the scraper blade 5 and urethane shields 6 will not pull apart.

A dust shield 11 (FIG. 3 and FIG. 4) may be provided to keep dust and residue out of housing 14. It may be a thin rubber material, such as about one-sixteenth inch in thickness, fitted tightly around the slot 4 creating a gasket seal between the T-bar 30 and housing 14. It is held in place by a steel bracket 12 (FIG. 3 and FIG. 4), such as an angle iron steel bracket welded to the housing 14.

In operation, the scraper 40 is mounted on the conveyor adjacent wherever it is desired to divert the residue from the belt, such as at the discharge point. The air intake mounting bracket 13 is connected to the air supply and pressurized air is delivered to air bladders 7 to adjust the height and pressure of scraper blade 5 against the belt surface. Periodically the air pressure is increased as scraper blade 5 wears down, until it is necessary to remove scraper to replace scraper blade 5.

The end caps 21 (FIG. 1) are preferably rectangular five inch by four inch by quarter inch thick plate steel that have four equal holes spaced in each corner as slots. These slots, measuring one inch by half inch, are positioned a quarter of an inch in from the top and bottom and a quarter of an inch in from either side. The end caps 21 are welded to each end of the steel tube 14. This weld goes down each side and across the top of the steel tube 14. The end cap 21 functions as the mounting brackets for the scraper.

By making housing 14 a two-inch by four-inch rectangular steel tube, preferably of three sixteenth-inch thick steel, the rigidity needed to span lengths up to one hundred inches is provided. On lengths greater than thirty-six inches on the cleaning blade width, a one inch bridge may be provided along the blade slot 4 to add more strength and to keep the square tube from distorting under the scraping action of the removal of product from the face of the belt. The end caps 21 are welded on the ends with a four bolt construction for mounting, so the scraper will not twist under the pressure and force required to clean the conveyor belt.

Figure 10:
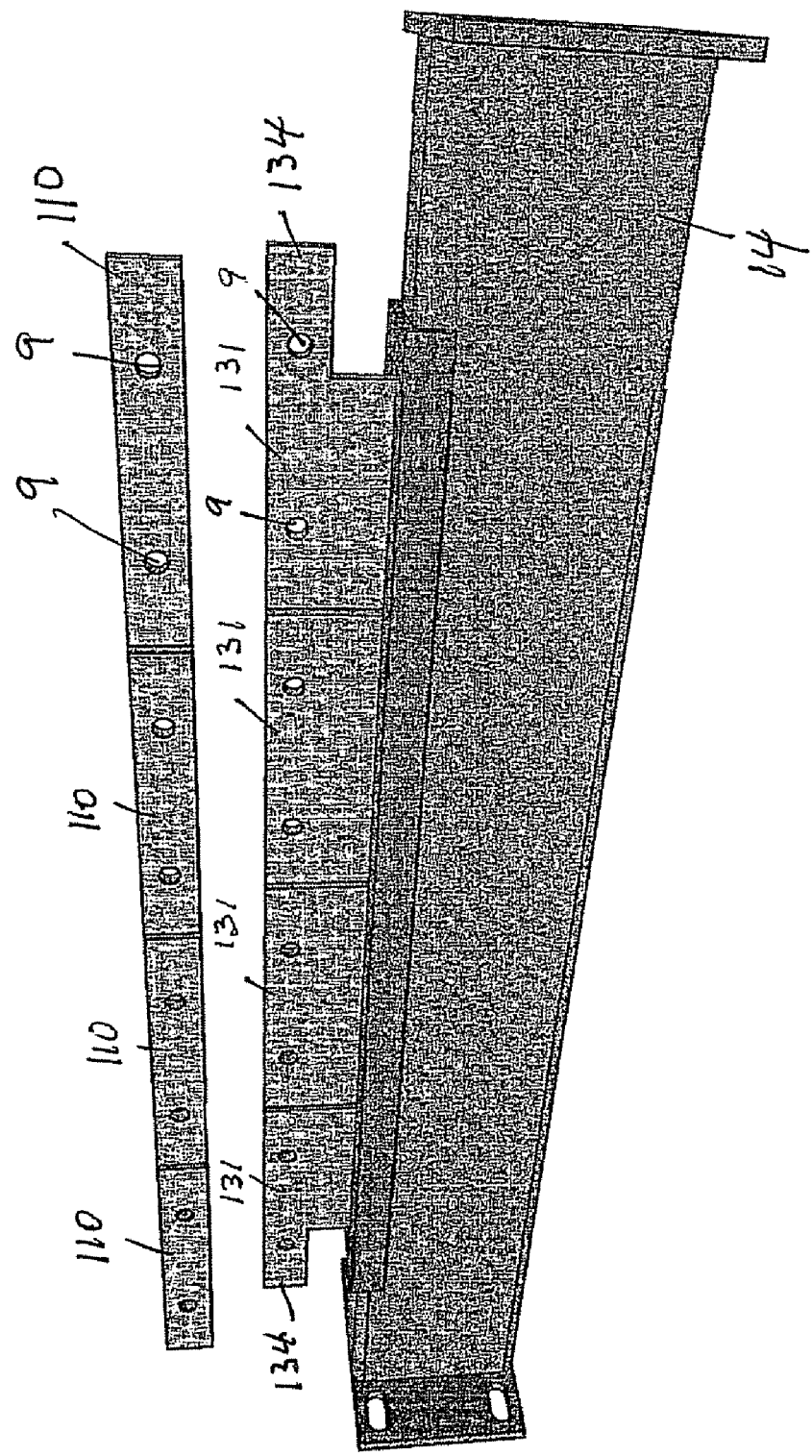
FIG. 10 is a front perspective view of the scraper shown in FIG. 8 with the cleaning element removed.
Figure 11:
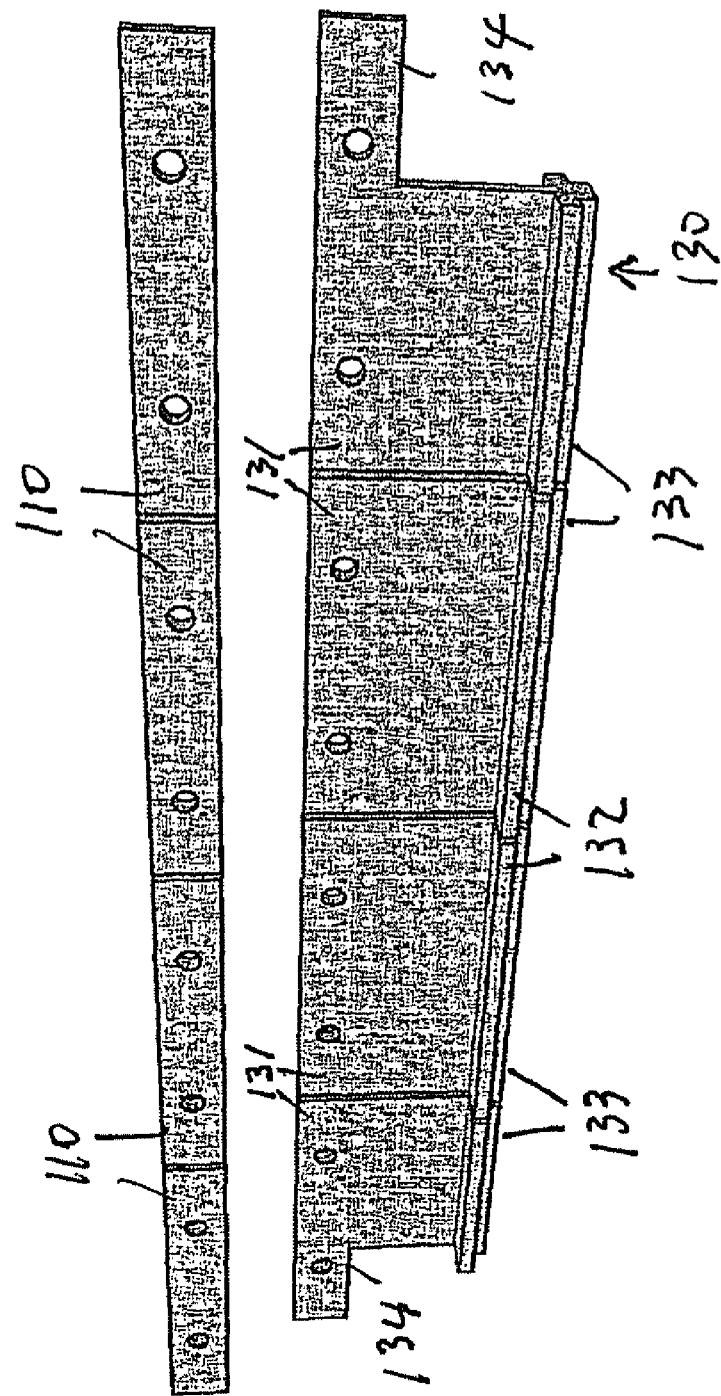
FIG. 11 is a front perspective view illustrating the T-bar element shown in FIG. 8.

A second embodiment of the invention is illustrated in FIG. 8-13 in which the T-bar 130 is segmented. T-bar 130 comprises four mounting plate sections 131, four base sections 132, and four spacer sections 133. Mounting plate sections 131 extend through the slot 4 of the housing 14 and serve as the means to hold the scraper blade 5 and the urethane shields 6 as described above. As shown in FIGS. 10 and 11, steel tabs 134 may be formed on the two end sections 131 to permit the scraper blade 5 to extend over a greater length and be centered on the housing 14 notwithstanding that a portion of the housing is occupied by the air manifold 15 and connection to air bladder 7. Attachment bar 110 also comprises four sections.

Figure 12:
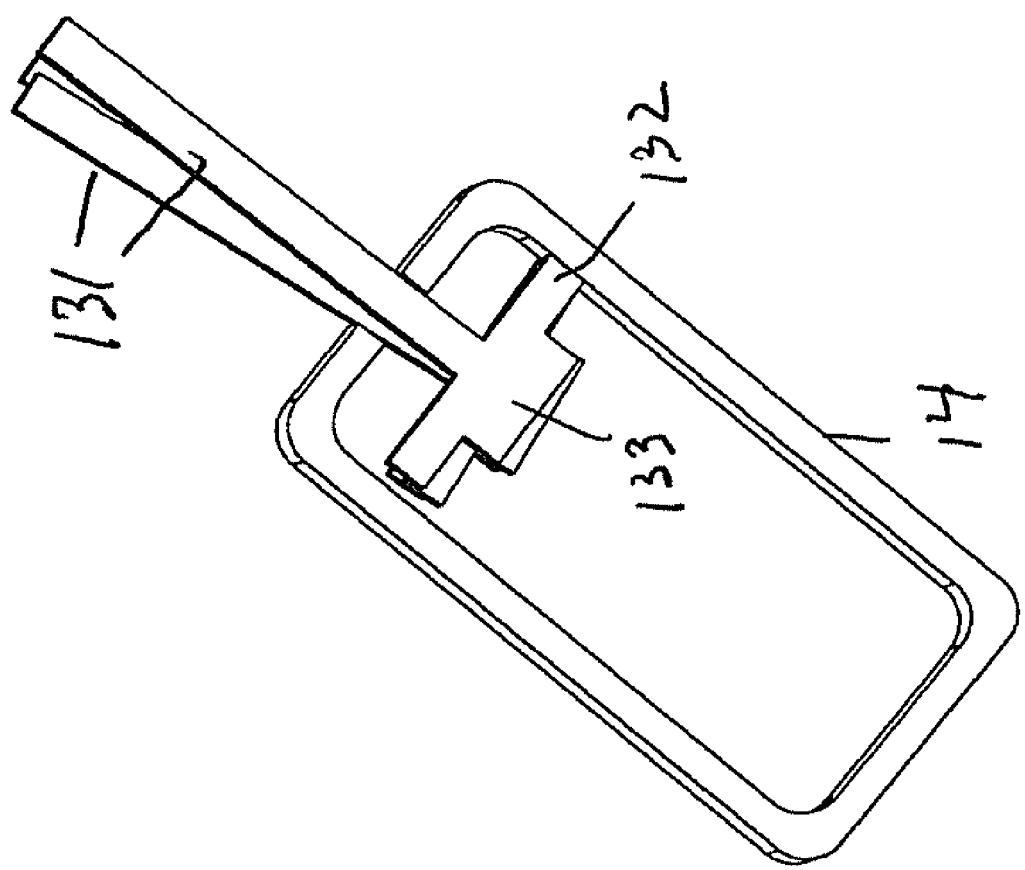
FIG. 12 is an end view illustrating the T-bar element shown in FIG. 8.
Figure 13:
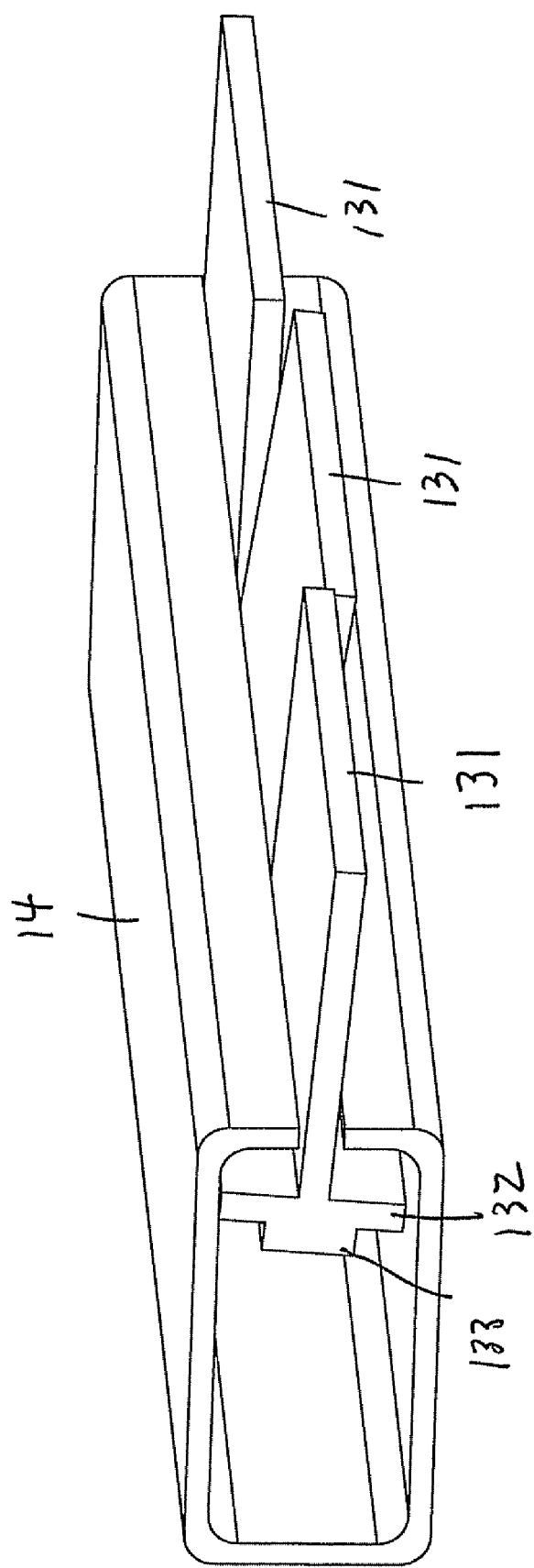
FIG. 13 is a perspective view illustrating the T-bar element shown in FIG. 8.

Each mounting plate section 131 of T-bar 130 and attachment bar sections 110 have a series of bolt holes 9 (FIG. 3) drilled or punched along the upper edge for attaching the scraper blade 5. In this way, as shown in FIGS. 12 and 13, when under pressure from an irregularity on the conveyor belt, one of the mounting plate sections 131 can tilt slightly forward or back or travel up and down independently of the other mounting plate sections 131 to react to the obstacles that a conveyor belt may encounter. This permits the other portions of the scraper blade away from the obstacle or irregularity to maintain better contact for scraping the rest of the conveyor belt surface. While a T-bar 130 comprising four segments has been illustrated, a greater or lesser number of segments can be used depending on the width of the conveyor.

The conveyor belt scraper according to the invention is therefore easy to install and maintain on conveyor systems. It can be used for many different diverting applications such as: i) reversing conveyor belts; ii) conveyor belts with head pulleys that have a welded on lagging resulting in gaps that the conveyor belt molds too as it travels; iii) laced joints in the conveyor belt; iv) steel plates that hold conveyor belt repairs together; v) used belts with uneven surfaces; vi) diverting carry back product, water or liquid off the conveyor belt; vii) removal of dry or wet residue. The invention has application to conveyor belts in the food industry, agriculture, waste products, recycling, airports, package handling, mill industry, mining or applications where conveyor belts have oil on them.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:
1. A conveyor belt cleaning device comprising:
  (a) an elongate housing having a hollow interior and an elongated slot in the upper surface thereof communicating with said hollow interior;
  (b) a plurality of T-shaped elements, each independently movable in relation to said housing, each comprising a base element contained within said hollow interior of said housing which is wider than said elongated slot and a scraper blade mounting element secured to said base element and extending through said slot;
  (c) an elongate scraper element removably attachable to said scraper blade mounting element of each said T-shaped element and having an elongated scraping edge adapted to make scraping contact with a surface of a conveyor belt to be cleaned;
  (d) an elongate flexible pressurized element mounted within said housing on the opposite side of said base element of each said T-shaped element from said elongated slot for adjustably applying pressure to each said base element of each said T-shaped element;
  wherein said slot, said hollow interior and said T-shaped elements are configured to allow said T-shaped elements to independently pivot between the longitudinal edges of said slot to thereby allow a portion of said elongated scraping edge to move in a direction both perpendicular to and tangential to the surface of the conveyor belt.
2. The conveyor belt cleaning device of claim 1 further comprising:
  (e) a gasket member secured to said housing in the area of said slot to seal the space between said mounting plate and said housing to thereby prevent ingress of dust or debris into said hollow interior of said housing.

3. The conveyor belt cleaning device of claim 1 further comprising:
(f) a debris shield secured to opposite lateral sides of said scraper element.

4. The conveyor belt cleaning device of claim 1 wherein said elongate flexible pressurized element comprises an air bladder connected to an air intake valve.

5. The conveyor belt cleaning device of claim 4 wherein said elongate flexible pressurized element comprises an air bladder folded in half and connected at its ends to a manifold which connects to an air intake valve.

* * * * *